United States Patent
Kawamoto

[11] Patent Number: 6,019,467
[45] Date of Patent: Feb. 1, 2000

[54] HINGE FOR TEMPLE AND LENS FRAME OF EYEGLASSES

[75] Inventor: Shuichi Kawamoto, Osaka, Japan

[73] Assignee: Kawamoto Optical Industrial Co., Ltd., Osaka, Japan

[21] Appl. No.: 09/272,280

[22] Filed: Mar. 19, 1999

[30] Foreign Application Priority Data

Apr. 7, 1998 [JP] Japan ................................. 10-112706

[51] Int. Cl.[7] .................................................... G02C 5/22
[52] U.S. Cl. ............................ 351/153; 351/113; 16/228
[58] Field of Search ..................... 351/153, 113, 351/114, 121; 16/228

[56] References Cited

U.S. PATENT DOCUMENTS 5,818,567  10/1998  Sakai ........................................ 351/153

*Primary Examiner*—Huy Mai
*Attorney, Agent, or Firm*—Bacon & Thomas, PLLC

[57] ABSTRACT

Eyeglasses having lenses, a lens frame, temples and hinges that connect the lens frame with the temples. The hinge parts are provided with elasticity or play. At the ends of the lens frame, hinge projections each having a deep hole and an elongated hole are established. At one end of each temple, a hinge thick part having two holes on the same axis is provided. A leaf spring is inserted in the deep hole, while a stem that runs through the elongated hole of the hinge projection and the two holes of the hinge thick part is provided so as to act on the leaf spring. The deep hole is the widest at its open end, and gets gradually narrower towards its deepest end. The leaf spring is preferably provided with a bendable part.

2 Claims, 4 Drawing Sheets

HINGE FOR TEMPLE AND LENS FRAME OF EYEGLASSES

FIELD OF THE INVENTION

The present invention relates to eyeglasses featuring a characteristic hinge between each temple and the lens frame.

PRIOR ART

Eyeglasses with hinges having no elasticity or play give the wearer an uncomfortable sensation because the inside of each temple presses each side of the wearer's face strongly. In order to solve this problem, eyeglasses of a special structure was proposed. According to this structure, a small case incorporating a pre-wound-up coil is established between each hinge and temple. The hinge and the temple are slidable with respect to each other so that there is play between them, and this reduces the sense of pressure to the wearer.

FIG. 6 shows an example of the elastic hinge with play that is widely used now. Between lens frame 15 and temple 18, a hinge 16 incorporating a coil spring 17 is established. When the temple is opened as indicated by the arrow, a member constituting the hinge 16 moves upward to the left along a groove formed on the temple 18 so as to push and compress one end of the spring 17. When the temple 18 is closed, the same member returns to its original position because of the force of the spring 17. This structure is not only complex and difficult to repair but also expensive to manufacture, and therefore has limited uses.

There is also a type of eyeglasses featuring leaf springs, but in this type, a gap occurs between the lens frame and each temple when in use, causing skin, hair or clothes to be caught between them.

SUMMARY OF THE INVENTION

The object of the present invention is to provide eyeglasses equipped with hinges that solve the above-mentioned problems, featuring a simple structure that is easy to manufacture and repair, having sufficient play, and creating no gaps between the temples and the lens frame when in use.

The eyeglasses of the present invention comprises lenses, a lens frame, temples and hinges that connect said lens frame and temples. Each hinge part comprises a (two-piece) hinge projection, a hinge thick part, a leaf spring and a stem. The hinge projection is established at one end of the lens frame and provided with a deep hole and an elongated hole. The hinge thick part is established at one end of the temple and provided with two holes on the same axis. The leaf spring is inserted in the deep hole. The stem runs through both the elongated hole of the hinge projection and the two holes of the hinge thick part and acts on the leaf spring.

Preferably, the elongated hole is established on the projection of the lens frame in such a way that the locus of its centre forms a partial arc, and that the centre of the arc is on the outer edge where the ends of the lens frame and the temple contact each other. In this way, there is no room for a gap to exist between the lens frame and the temple, and there is no possibility that skin, hair or clothes be caught between them.

Preferably, the deep hole is the widest at its open end and gets gradually narrower towards its deepest end, and the leaf spring has a bendable part. In this way, the leaf spring can be bent most effectively, giving sufficient flexibility to the hinge part.

According to the present invention, when the thick part of the temple and the lens frame is coupled via a rotary stem, the rotary stem pushes and bends the leaf spring that is inserted in the hole established between the two pieces of the projection of the lens frame, giving it a preliminary tension. When the rotary stem further moves along the inside of the elongated hole so as to pivot on the outer edge, the tension increases and gives the righting moment to the leaf spring to return the rotary stem, i.e., temple, to its original position.

The hinge of the present invention has a simple structure that is easy to manufacture and assemble. In addition, this hinge is easy to repair. As a result, it is possible to make eyeglasses using these hinges at low cost without sacrificing their functions. The self-aligning force or the pressure of the temples to the wearer's skin can be adjusted by changing the width and thickness of the leaf springs. This hinge can also be applied in a variety of eyeglasses from expensive eyeglasses to cheap disposable eyeglasses by, for example, adding or not adding a cover to its exposed part.

BRIEF DESCRIPTIONS OF THE DRAWINGS

Embodiments of the present invention will now be explained with reference to the accompanying drawings, in which.

Figure 1:
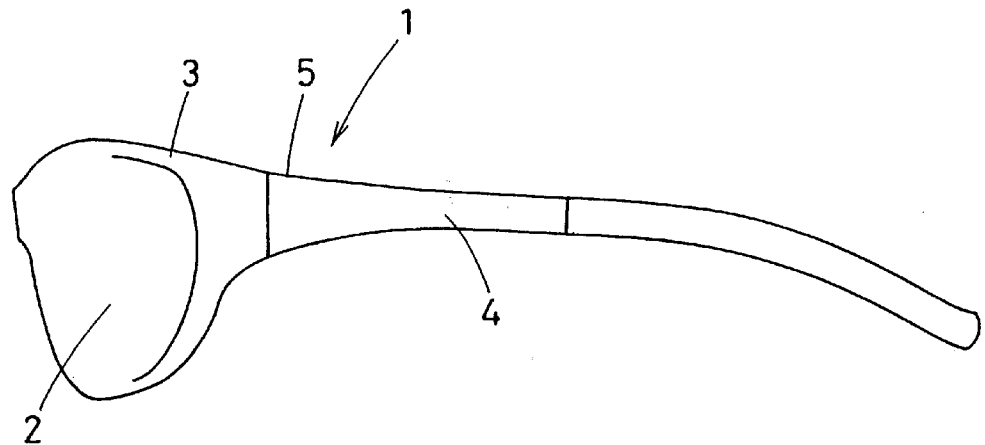
FIG. 1 is a side view of eyeglasses 1 in accordance with the first embodiment of the present invention.
Figure 4A:
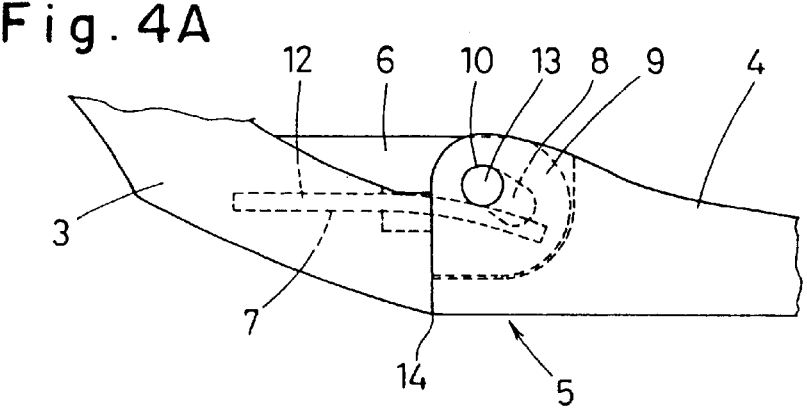
Figure 4B:
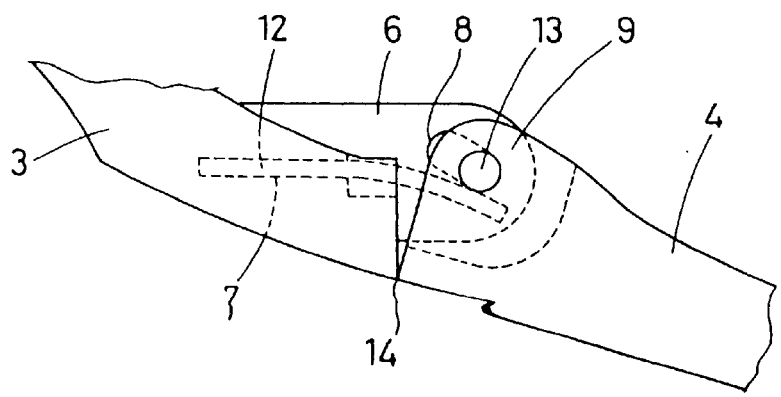

FIG. 4 shows top views of the hinge 5 that is on this side of the eyeglasses shown in FIG. 1. (A) shows a condition in which the left temple 4 is opened, and (B) shows a condition in which temple 4 is pushed outward along elongated hole 8.

Figure 5A:
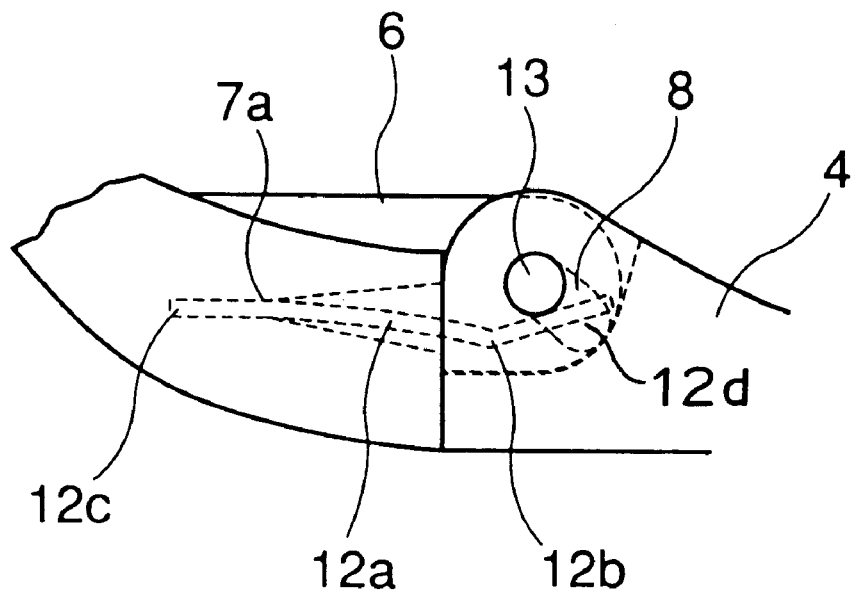
Figure 5B:
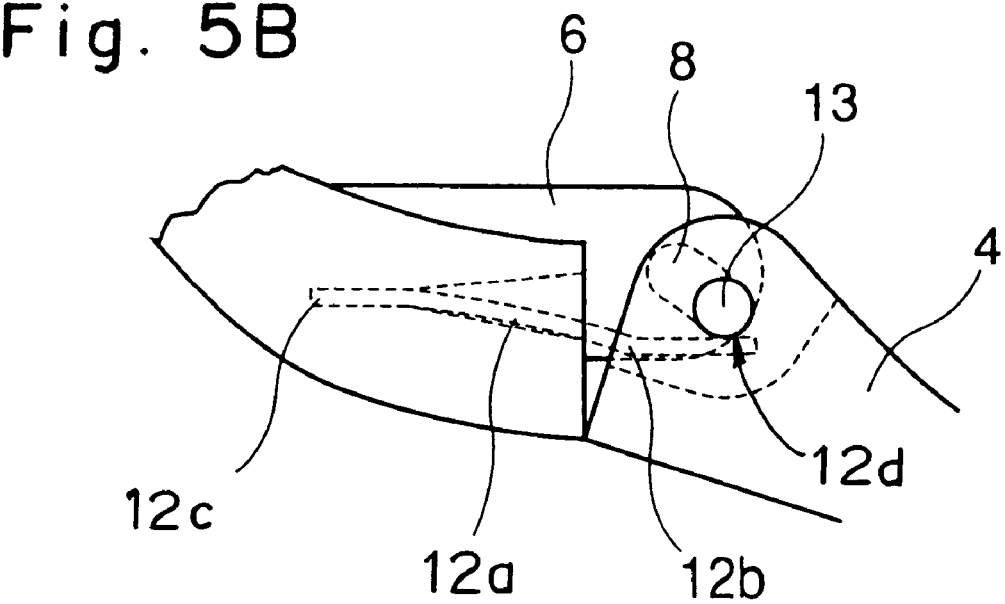

FIGS. 5 (A), (B) relate to the second embodiment of the present invention, each showing respectively the same conditions as those shown in FIG. 4. (FIG. 5 (A) shows the condition in which the left temple 4 is opened, and FIG. 5 (B) shows the condition in which temple 4 is pushed outward along elongated hole 8.)

Figure 6:
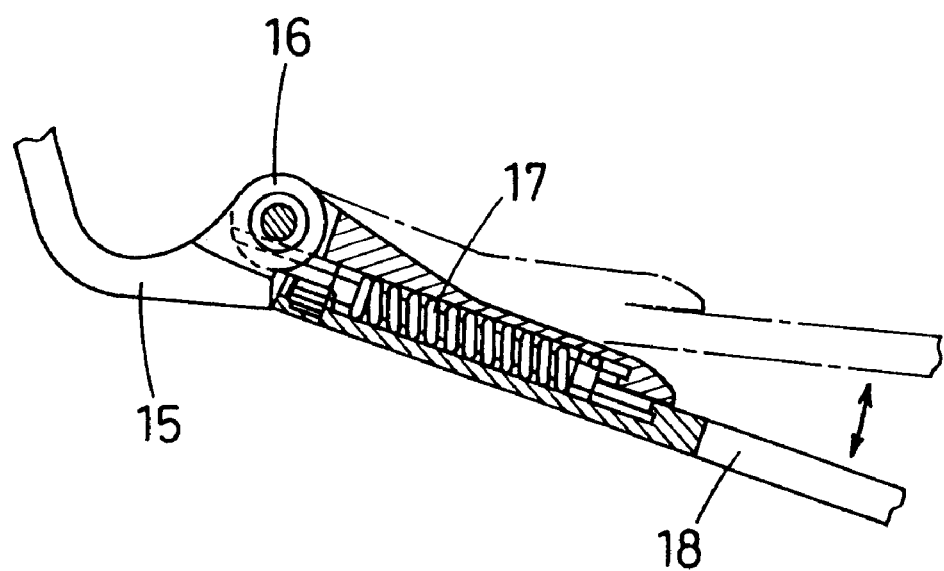

FIG. 6 is a partial section showing a conventional hinge part.

DESCRIPTION OF PREFERRED EMBODIMENTS

Figure 2:
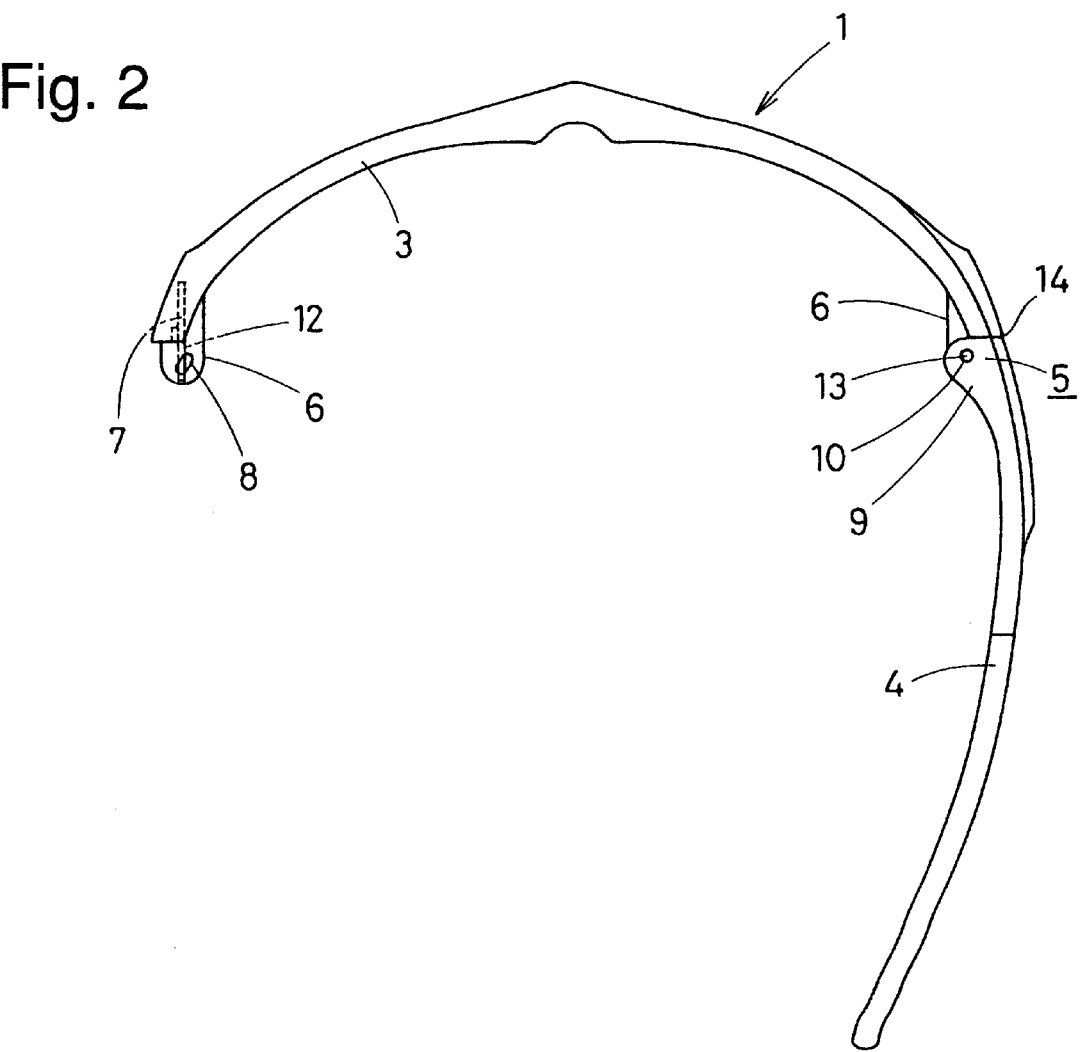
FIG. 2 shows a condition of the eyeglasses shown in FIG. 1, in which the temple and the rotary stem on one side are taken off and leaf spring 12 is exposed.

FIG. 1 is an exterior view of eyeglasses 1 in accordance with the first embodiment of the present invention, showing lens 2, lens frame 3, temple 4 and hinge 5 (not viewable from the surface). FIG. 2 shows a condition in which the left temple is taken off to reveal the shapes of projection 6, which protrudes from the lens frame 3 and constitutes the hinge 5, and of elongated hole 8, which is established on said projection. In this condition, leaf spring 12, which is inserted in hole 7 and has a rectangular section, extends and crosses the elongated hole 8. When temple 4 is fastened with a rotary stem 13 as shown on the right-hand side of the same drawing, the leaf spring is bent and given a preliminary tension.

Figure 3:
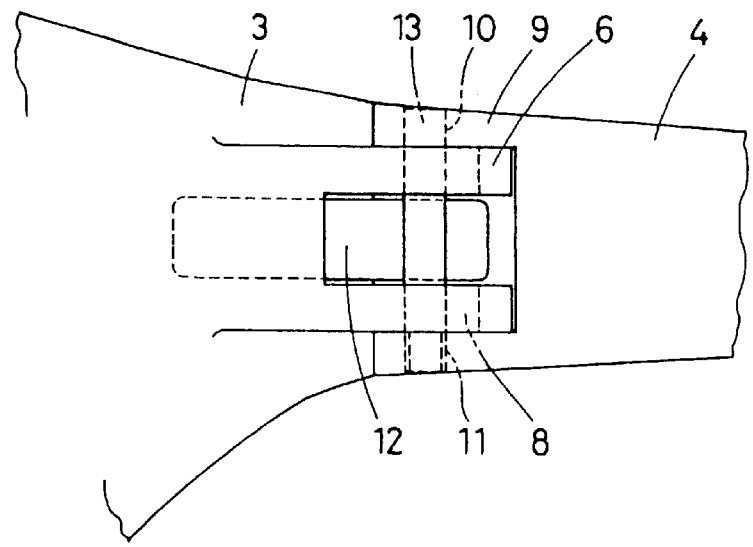
FIG. 3 shows an inside view of the right hinge 5 of eyeglasses 1.

FIG. 3 shows hinge 5 as seen from the inside of the eyeglasses. It shows the relationship between the projection 6 of the lens frame 3, the thick part 9 of the temple 4, the elongated hole 8, the leaf spring 12 and the rotary stem 13. After inserting leaf spring 12 into hole 7, lens frame 3 and temple 4 are put together, and then rotary stem 13 is inserted into elongated hole 8 through hole 10 so as to push and bend the leaf spring 12. Rotary screw 13 is then screwed into a screw hole 11 below.

The action of hinge 5 will now be explained with reference to FIGS. 4 (A, B). FIG. 4 (A) shows a condition in which temple 4 is opened in a normal manner. The respective ends of lens frame 3 and temple 4 are in close contact including the outer edges 14. In this condition, the leaf spring 12 is slightly bent, and the rotary stem 13 is positioned at the left end of the elongated hole 8. In FIG. 4 (B) temple 4 is pushed outward. The locus of the central longitudinal axis of elongated hole 8 forms a part of the circle having its center on the outer edge 14. As the rotary stem 13 moves along the elongated hole 8, the outer edges 14 do not get disjoined, and the rotary stem 13 moves on to the right end of the elongated hole 8 while further bending the leaf spring 12 and straining it. When the pushing and bending force is removed, the leaf spring 12 bounces the temple 4 back to its original position as shown in FIG. 4 (A).

The exposed part of the hinge can be provided with a cover using a publicly known means.

FIGS. 5 (A, B) shows the second embodiment of the present invention. Parts that are the same as those used in the first embodiment are given the same codes, and detailed explanations are not repeated. The second embodiment is different from the first embodiment in the following respects: there is a deep hole that is the widest at its open end and gets gradually narrower towards its bottom end, and there is a leaf spring 12a having a bendable part 12b. As shown in FIG. 5 (B), when temple 4 is pushed outward, the leaf spring 12a is fastened at its most backward position 12c, which becomes the fulcrum. A straight part 12d of the leaf spring functions as the first spring function that causes large bending. The bent part 12b functions as the second spring function causing further bending. As such, the second embodiment is superior to the first embodiment in flexibility.

I claim:

1. A hinge for pivotally connecting a lens frame to a temple member of a pair of eyeglasses and permitting the temple to pivot outwardly from the lens frame, the hinge comprising:

a) the lens frame including a spring hole formed therein, a projection having an elongated hole formed therein, a first end having a first outer edge, a leaf spring having a first portion disposed within the spring hole and a second portion extending outwardly of the spring hole and extending across the longitudinal center axis of the elongated hole when the spring is not under tension;

b) the temple including a thick part having a recess formed therein, a second end having a second outer edge, the projection of the lens frame being disposed within the recess, a rotary stem extending through the thick part and the elongated hole, the stem being disposed at a first end of the elongated hole and bending the second portion of the spring outwardly to impart a preliminary tension thereto for urging the first and second ends and outer edges into engagement with each other; and c) when the temple is pivoted outwardly from the lens frame, the rotary stem is caused to move along the elongated hole to a second end thereof and impose further tension to the spring, thereby causing the first and second ends to disengage from each other while maintaining the first and second outer edges in engagement with each other to define a pivot point forming the center of a circle partially defined by the locus of the longitudinal axis of the elongated hole and providing a restoring force for pivoting the temple back inwardly to its original position.

2. The hinge of claim 1 wherein the spring hole includes an open end which tapers inwardly towards a bottom end, the first portion of the spring having a terminal end disposed at the bottom end of the spring hole to define a fulcrum therewith, the second portion of the spring including a bent part and a straight part, the straight part being disposed in engagement with the rotary stem, whereby the straight part provides a first spring function and the bent part provides a second spring function when the rotary stem moves from the first end to the second end of the elongated hole during outward pivoting of the temple.

* * * * *